US012627467B2

(12) United States Patent
Chakraborty et al.

(10) Patent No.: US 12,627,467 B2
(45) Date of Patent: May 12, 2026

(54) MEMORY TRANSACTION PROTECTION METHODS AND CIRCUITRY

(71) Applicant: Axiado Corporation, San Jose, CA (US)

(72) Inventors: Ayanava Chakraborty, Redwood City, CA (US); Raghu Kondapalli, San Jose, CA (US); Gopi Sirineni, San Jose, CA (US)

(73) Assignee: Axiado Corporation, San Jose, CA (US)

( * ) Notice: Subject to any disclaimer, the term of this patent is extended or adjusted under 35 U.S.C. 154(b) by 186 days.

(21) Appl. No.: 18/179,142

(22) Filed: Mar. 6, 2023

(65) Prior Publication Data

US 2023/0291546 A1 Sep. 14, 2023

Related U.S. Application Data

(60) Provisional application No. 63/317,912, filed on Mar. 8, 2022.

(51) Int. Cl.
| | |
|---|---|
| *H04L 9/00* | (2022.01) |
| *H04L 9/06* | (2006.01) |
| *H04L 9/08* | (2006.01) |

(52) U.S. Cl.
CPC ............ *H04L 9/0631* (2013.01); *H04L 9/088* (2013.01)

(58) Field of Classification Search
CPC ...... H04L 9/0631; H04L 9/088; H04L 9/0891
See application file for complete search history.

(56) References Cited

U.S. PATENT DOCUMENTS

| | | |
|---|---|---|
| 8,170,204 B2 | 5/2012 | Chen |
| 10,396,978 B2 | 8/2019 | Choi et al. |
| 11,438,154 B2 | 9/2022 | Hassan et al. |
| 2016/0112188 A1* | 4/2016 | Choi ........................ G09C 1/00 |
| | | 380/28 |
| 2019/0114438 A1* | 4/2019 | Hersans ............... H04L 9/0877 |
| 2021/0266143 A1 | 8/2021 | Boue et al. |

* cited by examiner

*Primary Examiner* — Syed M Ahsan

(74) *Attorney, Agent, or Firm* — Wilson Sonsini Goodrich & Rosati

(57) ABSTRACT

Described herein, in certain embodiments, are computer-implemented memory protection systems comprising: a memory; and circuitry comprising an encryption algorithm and configured to perform operations comprising: encrypt, using the encryption algorithm, write operations to the memory; and decrypt, using the encryption algorithm, read operations from the memory. Further provided herein, in certain embodiments, are computer implemented method for memory protection.

27 Claims, 12 Drawing Sheets

MEMORY TRANSACTION PROTECTION METHODS AND CIRCUITRY

CROSS-REFERENCE TO RELATED APPLICATIONS

This application claims the benefit of U.S. Provisional Application No. 63/317,912, filed Mar. 8, 2022, which is incorporated herein by reference in its entirety.

BACKGROUND

Physical sniffing of memory transactions to gain access to data has been on the rise in many server, network, and other infrastructure deployments. Therefore, there is a need to address this vulnerability to offer security protection against malicious actors in a data center, telecom, or any other environment.

SUMMARY

Security protections required by today's complex networks include the ability to prevent physical sniffing of memory transactions by malicious actors. These threats may be in a data center, telecom, or any other environment where information is being written to and read from a memory. During such network threats, information (e.g., in network packets) may be accessed by malicious actor, which can result in compromised sensitive information or personal information. Therefore, a security architecture that is compatible to various types of industrial models is needed to prevent malicious actors from gaining access to such information.

One way to address this vulnerability in many of today's server, network and other infrastructure deployments is to provide a security pipeline comprising encryption operations with user configurability. Encryption operations can be performed by an encryption algorithm that encrypts transactions on the way to the memory (e.g., write operations) and decrypts data on the way back from memory (e.g., read operations). The encryption operation can comprise a plurality of stages and various block sizes specified by a user depending on the task at hand, which can allow for improved efficiency and performance. Such a security pipeline can prevent a malicious actor aiming access information stored in the memory, while providing a user high specificity to streamline memory protection.

In one aspect, disclosed herein are computer-implemented memory protection system comprising: a memory; and circuitry comprising an encryption algorithm and configured to perform operations comprising: encrypt, using the encryption algorithm, write operations to the memory; and decrypt, using the encryption algorithm, read operations from the memory; wherein the encryption algorithm comprises a user configurable block size and partitions the memory based on the user configurable block size; wherein the encryption algorithm comprises a pipelined design comprising a plurality of stages, each stage conducting a round of an encryption operation, passing data computed to a next stage until a final stage is reached, and comprising its own key scheduler; and wherein the encryption algorithm comprises a user configurable number of rounds for the encryption operation. In some embodiments, the memory is implemented on a chip with the circuitry. In some embodiments, the memory implemented external to the circuitry. In some embodiments, the system is configured to encrypt all transactions with the memory. In some embodiments, the encryption algorithm comprises an XTS-AES algorithm and the encryption operation comprises an AES encryption operation. In some embodiments, the block size is user configurable through a user interface. In some cases, the block size is set at boot-time and cannot be changed at run-time. In some embodiments, the number of rounds for the encryption operation is user configurable through a user interface. In some cases, the number of rounds for the encryption operation is set at boot-time and cannot be changed at run-time. In some embodiments, the block size is 64, 128, 256, or 512 bytes. In some embodiments, the block size has a minimum of 64 bytes. In some embodiments, the block size has a maximum of 512 bytes. In some embodiments, the number of rounds for the encryption operation is 4, 5, 6, 7, 8, 9, or 10. In some embodiments, the number of rounds for the encryption operation has a minimum of 4. In some embodiments, the number of rounds for the encryption operation has a maximum of 10. In some embodiments, the pipeline comprises a 4-bit select bit to configure the number of rounds for the encryption operation. In some embodiments, the pipeline comprises 10 stages.

In another aspect, disclosed herein are computing devices comprising the memory protection system comprising: a memory; and circuitry comprising an encryption algorithm and configured to perform operations comprising: encrypt, using the encryption algorithm, write operations to the memory; and decrypt, using the encryption algorithm, read operations from the memory; wherein the encryption algorithm comprises a user configurable block size and partitions the memory based on the user configurable block size; wherein the encryption algorithm comprises a pipelined design comprising a plurality of stages, each stage conducting a round of an encryption operation, passing data computed to a next stage until a final stage is reached, and comprising its own key scheduler; and wherein the encryption algorithm comprises a user configurable number of rounds for the encryption operation.

In another aspect, disclosed herein are computer-implemented methods of memory protection comprising: providing an interface allowing a user to configure a block size used by an encryption algorithm; providing an interface allowing a user to configure a number of rounds for an encryption operation performed by the encryption algorithm; encrypting, utilizing the encryption algorithm, write operations to the memory, the encryption algorithm comprising a pipelined design comprising a plurality of stages, each stage conducting a round of the encryption operation, passing data computed to a next stage until a final stage is reached, and comprising its own key scheduler; and decrypting, utilizing the encryption algorithm, read operations from the memory, the decrypting performed by the encryption algorithm. In some embodiments, the encrypting comprises partitioning the memory based on the block size. In some embodiments, c) and d) are performed by circuitry, and wherein the memory is implemented on a chip with the circuitry. In some embodiments, c) and d) are performed by circuitry, and wherein the memory is implemented external to the circuitry. In some embodiments, the encrypting and decrypting are performed on all transactions with the memory. In some embodiments, the encryption algorithm comprises an XTS-AES algorithm and the encryption operation comprises an AES encryption operation. In some embodiments, the block size is user configurable through a user interface. In some cases, the block size is set at boot-time and cannot be changed at run-time. In some embodiments, the number of rounds for the encryption operation is user configurable through a user interface. In some cases, the number of rounds for the encryption operation is set at boot-time and cannot be changed at run-time. In some embodiments, the block size is 64, 128, 256, or 512 bytes. In some embodiments, the block size has a minimum of 64 bytes. In some embodiments, the block size has a maximum of 512 bytes. In some embodiments, the number of rounds for the encryption operation is 4, 5, 6, 7, 8, 9, or 10. In some embodiments, the number of rounds for the encryption operation has a minimum of 4. In some embodiments, the number of rounds for the encryption operation has a maximum of 10. In some embodiments, the pipeline comprises a 4-bit select bit to configure the number of rounds for the encryption operation. In some embodiments, the pipeline comprises 10 stages.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
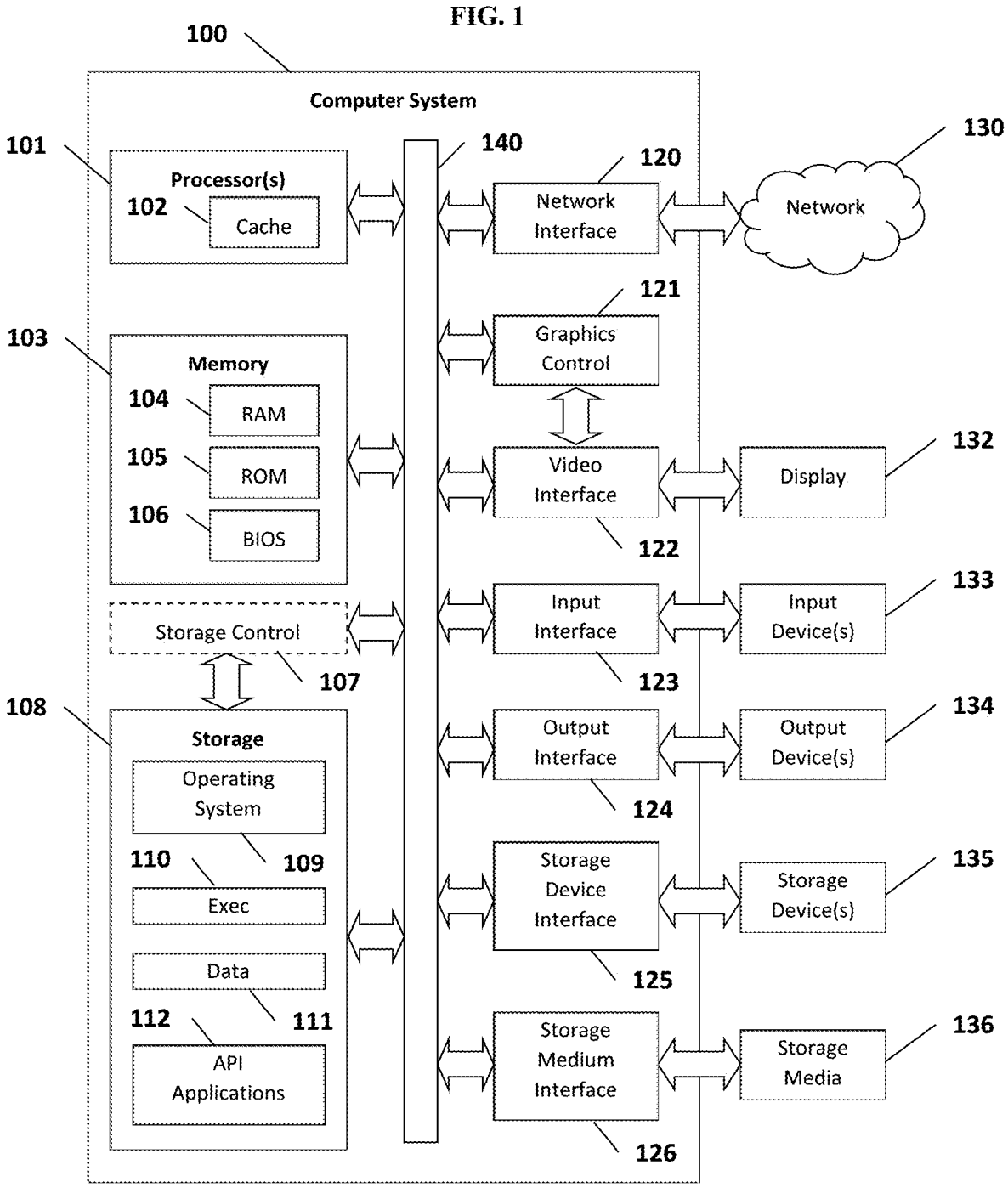
FIG. 1 shows a non-limiting example of a computing device; in this case, a device with one or more processors, memory, storage, and a network interface.

Described herein, in certain embodiments, are computer-implemented memory protection systems comprising: a memory; and circuitry comprising an encryption algorithm and configured to perform operations comprising: encrypt, using the encryption algorithm, write operations to the memory; and decrypt, using the encryption algorithm, read operations from the memory; wherein the encryption algorithm comprises a user configurable block size and partitions the memory based on the user configurable block size; wherein the encryption algorithm comprises a pipelined design comprising a plurality of stages, each stage conducting a round of an encryption operation, passing data computed to a next stage until a final stage is reached, and comprising its own key scheduler; and wherein the encryption algorithm comprises a user configurable number of rounds for the encryption operation.

Also described herein, in certain embodiments, are computing devices comprising a memory protection system comprising: a memory; and circuitry comprising an encryption algorithm and configured to perform operations comprising: encrypt, using the encryption algorithm, write operations to the memory; and decrypt, using the encryption algorithm, read operations from the memory; wherein the encryption algorithm comprises a user configurable block size and partitions the memory based on the user configurable block size; wherein the encryption algorithm comprises a pipelined design comprising a plurality of stages, each stage conducting a round of an encryption operation, passing data computed to a next stage until a final stage is reached, and comprising its own key scheduler; and wherein the encryption algorithm comprises a user configurable number of rounds for the encryption operation.

Further described herein, in certain embodiments, are computer-implemented methods of memory protection comprising: providing an interface allowing a user to configure a block size used by an encryption algorithm; providing an interface allowing a user to configure a number of rounds for an encryption operation performed by the encryption algorithm; encrypting, utilizing the encryption algorithm, write operations to the memory, the encryption algorithm comprising a pipelined design comprising a plurality of stages, each stage conducting a round of the encryption operation, passing data computed to a next stage until a final stage is reached, and comprising its own key scheduler; and decrypting, utilizing the encryption algorithm, read operations from the memory, the decrypting performed by the encryption algorithm.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used herein, the term "malicious actor" generally refers to unwanted, hostile, or intrusive activity in a network infrastructure that can compromise any one of information integrity, confidentiality, and availability. In some embodiments, the activity aims to disrupt the network infrastructure, collect private or sensitive information, or access private computer systems or networks in the network infrastructure. An actor or entity carrying out the malicious activity may be referred to as a "malicious actor" or a "malicious entity," respectively.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus, or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMO-LED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDER-BOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, handheld computers, Internet appliances, mobile smartphones, and tablet computers. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Memory Security

In order to provide memory security in servers, networks, or other infrastructure deployments, a user configurable memory protection system can be employed to provide an encryption pipeline with specificity to a user's task. In some embodiments, the memory protection system comprises a memory and a circuitry. In some cases, the memory is implemented on a chip with the circuitry (e.g., on-chip memory). In some cases, the memory is implemented external to the circuitry (e.g., off-chip memory). In some cases, the circuitry comprises an etched circuit (e.g., printed circuit boards (PCB)), an application specific integrated circuit (ASIC), a field programmable gate array (FPGA) or any other programmable logic.

Encryption Algorithm

Offering security protection in various data center, telecom or any other network infrastructure environment often comprises encryption for ensuring security and/or privacy of sensitive or personal information in the network infrastructure. Encryption may be performed by an encryption algorithm, which may be designed to provide both encryption and integrity protection. The encryption algorithm may be applied to a memory within the network infrastructure to prevent a malicious actor from being able to access information stored on the memory.

In some embodiments, the circuitry in the memory protection system comprises an encryption algorithm to encrypt transactions on the way to the memory (e.g., write operations) and decrypt data on the way back from memory (e.g., read operations). In some cases, all transactions are encrypted and/or decrypted with the memory. The encryption algorithm can comprise multiple rounds of encryption to prevent a malicious actor from being able to decipher information in a memory of a network. Encryption algorithms may comprise, by way of non-limiting example, a Data Encryption Standard (DEA) algorithm, an Advanced Encryption Standard (AES) algorithm, or an AES-XTS (XEX Tweakable Block Ciphertext Stealing) algorithm. In some embodiments, the encryption algorithm comprises an AES encryption operation.

An as example, AES-XTS protocol may be used for memory transaction cryptography, as it can provide confidentiality for block-oriented transactions without compromising authentication. Further, CPUs operate off of 64 bytes (e.g., one cache line) as minimum accessible memory transaction size. The AES-XTS protocol can use 128 or its multiple (e.g., 192 or 256) for data encryption, and uses AES block cipher as a subroutine. The data can be divided into equal-size data units with contiguous locations.

An AES encryption operation may comprise encrypting 128-bit, 192-bit, or 256-bit data with a 128-bit, 192-bit, or 256-bit key, respectively. Further, 128-bit, 192-bit, or 256-bit data may be encrypted over 10 iterations, 12 iteration, or 14 iterations, respectively. Each iteration (or round) may require its own key (e.g., a round key), which may be generated using a key scheduler. In some cases, a key scheduler may comprise an algorithm that expands an initial key into a number of separate round keys (e.g., key expansion) for each iteration. For example, the first key generated by the key scheduler can be utilized in the first iteration, the second key generated by the key scheduler can be utilized in the second iteration, the third key generated by the key scheduler can be utilized in the third iteration, and so on. Each iteration (or round) of the AES encryption operation may comprises the steps of: 1) byte substitution, 2) shifting rows, 3) mixing columns, and 4) adding a round key. In some embodiments, the text to be encrypted (e.g., plaintext) may be converted into binary or hexadecimal text prior to step 1). In some embodiments, the text may be arranged in a matrix (e.g., 16 bytes arranged in a four by four matrix).

During 1) byte substitution, input bits can be substituted using a look-up table to transform them into output bits. In some embodiments, each matrix element is substituted using the look-up table. In some embodiments, the input bits comprise plaintext. In some cases, the input bits and the output bits are not the same number of bits. In some cases, the input bits and the output bits are the same number of bits. In some embodiments, the look-up table comprises a substitution box (S-box) or an inverse substitution box (INV S-box). In some cases, the S-box is a Rijndael S-box. In step 2) of the AES encryption operation, rows in the matrix may be shifted. For example, in a four by four matrix, the first row is not shifted, while the second row, third row, and fourth row are each shifted one, twice, or thrice, respectively, to the left. Alternatively, the matrix elements can be shifted to the right. Once the rows have been shifted, the columns of the matrix may be mixed in step 3). In some embodiments, each column in the matrix can be multiplied with a specific matrix to ensure each matrix element (e.g., each byte) is altered. As a non-limiting example, a matrix multiplied to a column may comprise:

$$\begin{bmatrix} 2 & 3 & 1 & 1 \\ 1 & 2 & 3 & 1 \\ 1 & 1 & 2 & 3 \\ 3 & 1 & 1 & 2 \end{bmatrix}.$$

In step 4), a round key from the key scheduler may be combined with each corresponding matrix element (e.g., each byte) using an XOR operation. In some embodiments, the key scheduler comprises a Rijndael's key schedule. In some embodiments, the last encryption iteration (e.g., tenth round for AES-128), does not comprise 3) mixing columns. In some embodiments, the output comprises ciphertext when this is the last step of the last encryption iteration.

Further, decryption comprises the encryption steps, but may instead be in the order of: 2) shifting rows, 1) byte substitution, 4) adding round key, and 3) mixing columns. In some cases of AES-128 with 10 rounds, the 11th key generated by the key scheduler can be utilized for the first iteration of the decryption. In some embodiments, the last decryption round (e.g., tenth decryption round for AES-128) does not comprise step of 3) mixing columns.

As an example, 128-bit (16 bytes) data can be encrypted using an encryption engine in 12 clock cycles: one cycles for initial key expansion by the key scheduler, 10 cycles for the 10 rounds, and one cycle for the output stage (e.g., outputting the ciphertext). In such an example, the key expansion can take in an input key, and provide an linear array of output sufficient to provide keys (e.g., round keys) for each of the 10 rounds. In some embodiments, the 10 rounds of the algorithm may comprise parallel execution of key scheduling for each 16 bytes of the data. Decryption may be performed similarly to the encryption process, but instead using a decryption engine. In some embodiments, the decryption process may require that the 10 keys be derived prior to the 10 rounds of decryption of the ciphertext. As such, the decryption process may comprise 24 clock cycles. In some cases, this implementation is open source and comprises a lookup table to store values needed to generate the keys. In some instances, the look-up table may comprise the dimensions of 256*4*32 bits each for the encryption and decryption process. In some cases, using the implementation comprising a lookup table, encryption and decryption may each be achieved in 12 cycles.

In some embodiments, an AES-XTS algorithm can be utilized in a memory protection system, such as those described herein. The XTS (XEX Tweakable Block Cipher-text Stealing) protocol comprises a block cipher mode of operation using block cipher algorithm (e.g., AES). In some cases, XEX can encrypt or decrypt data size multiple of 16 bytes. In some cases, XTS can encrypt or decrypt a data size of multiple of 16 bytes. In some cases, XTS can encrypt or decrypt a data size of non-multiple of 16 bytes (e.g., arbitrary length of data block, such as 256 bits or 257 bits). Thus, in some instances, using XTS, the input or output data may comprise a number of blocks of 128 bits followed by a separated partial block which may be less than 128 bits.

According to the XTS protocol, two sets of 16 byte keys may be used: one for encrypting data and one for encrypting a tweak value. In some embodiments, the two sets of keys may comprise AES keys (e.g., for AES-XTS encryption mode). In some cases, one of the two sets of keys may be used for the AES block encryption as described herein. In some cases, one of the two sets of key may be used to encrypt the tweak value. In some cases, the tweak may comprise a sector address, the index of the block within the sector, or a combination thereof. In some embodiments, using this protocol, encryption can take 12 cycles to encrypt the tweak and 12 cycle there onward to encrypt each 16 bytes of data (e.g., using an encryption engine). In some cases, the tweak value can be propagated and modified (e.g., using a Galois polynomial function (GF), XOR, etc.) with both the plaintext and/or ciphertext of each block. In some embodiments, decryption can take 12 cycles to encrypt the tweak and 24 cycles there onwards to decrypt each 16 bytes of data (e.g., using a decryption engine), as described herein.

Encryption Pipeline

Figure 2:
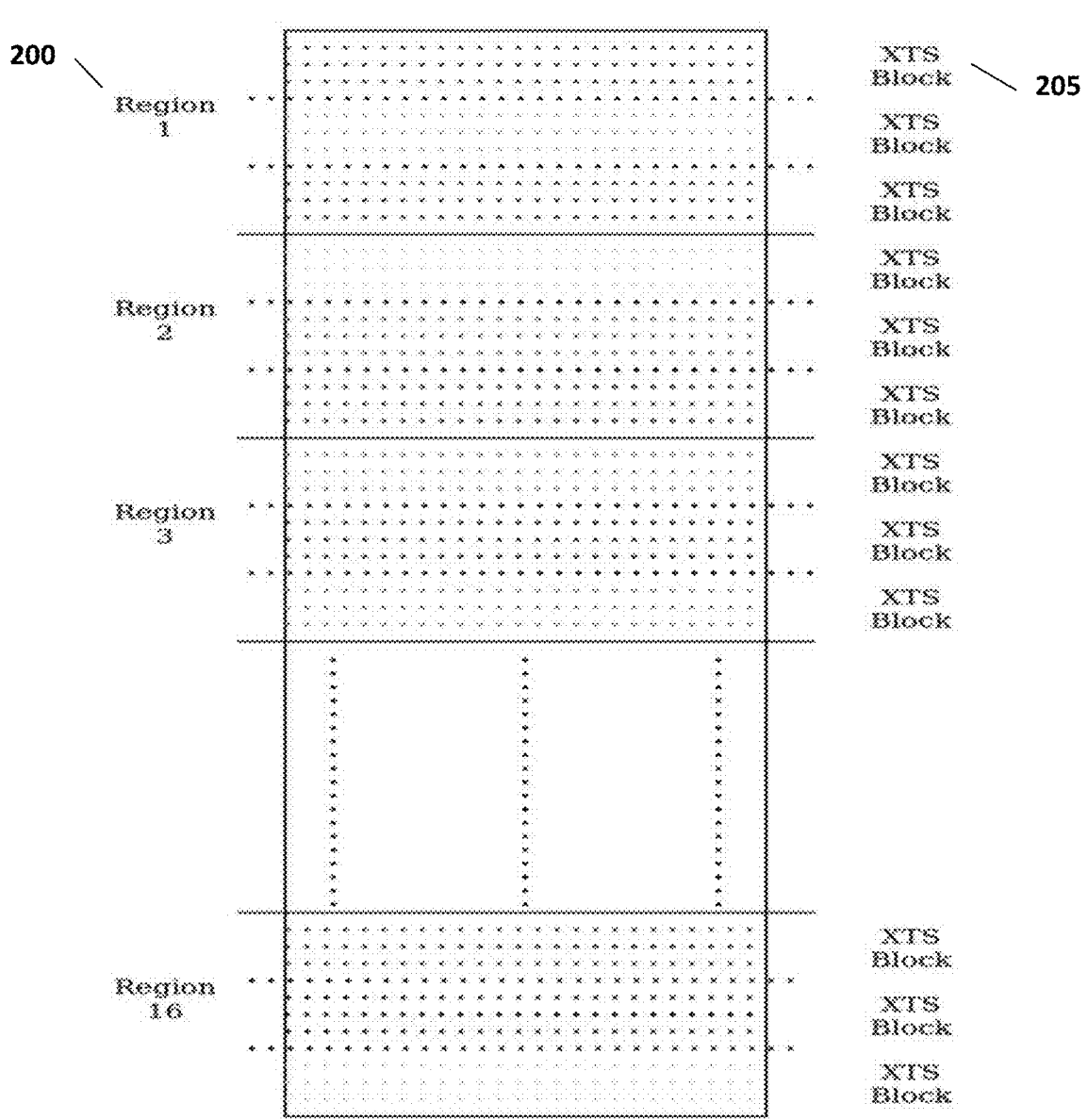
FIG. 2 shows a non-limiting example of a sub-divided memory block, in accordance with some embodiments.

Encryption algorithms, such as the AES-XTS algorithm, can be used to encrypt memory data, that has been sub-divided, as shown in FIG. 2. In some embodiments, the whole memory block may be sub-divided and encrypted according to the AES encryption operations described herein. FIG. 2 illustrates a non-limiting example of a sub-divided memory block comprising regions 200 of data sub-divided as XTS blocks 205. In some embodiments, the XTS block 205 is 64, 128, 256, or 512 bytes, which can be determined based on user configuration. In some cases, the block size has a minimum of 64 bytes. In some cases, the block size has a maximum of 512 bytes. In some cases, user configurability of the block size can improve performance of the AES-XTS algorithm. As an example, a user may want to monitor network traffic, where the network packet size is 64 bytes (e.g., 14 bytes for the header, 46 bytes the data (payload), and 4 bytes for the frame check sequence (cyclic redundancy check)). In such an example, the user may configure the XTS block size to be 64 bytes, which can improve performance of the encryption algorithm.

Figure 3:
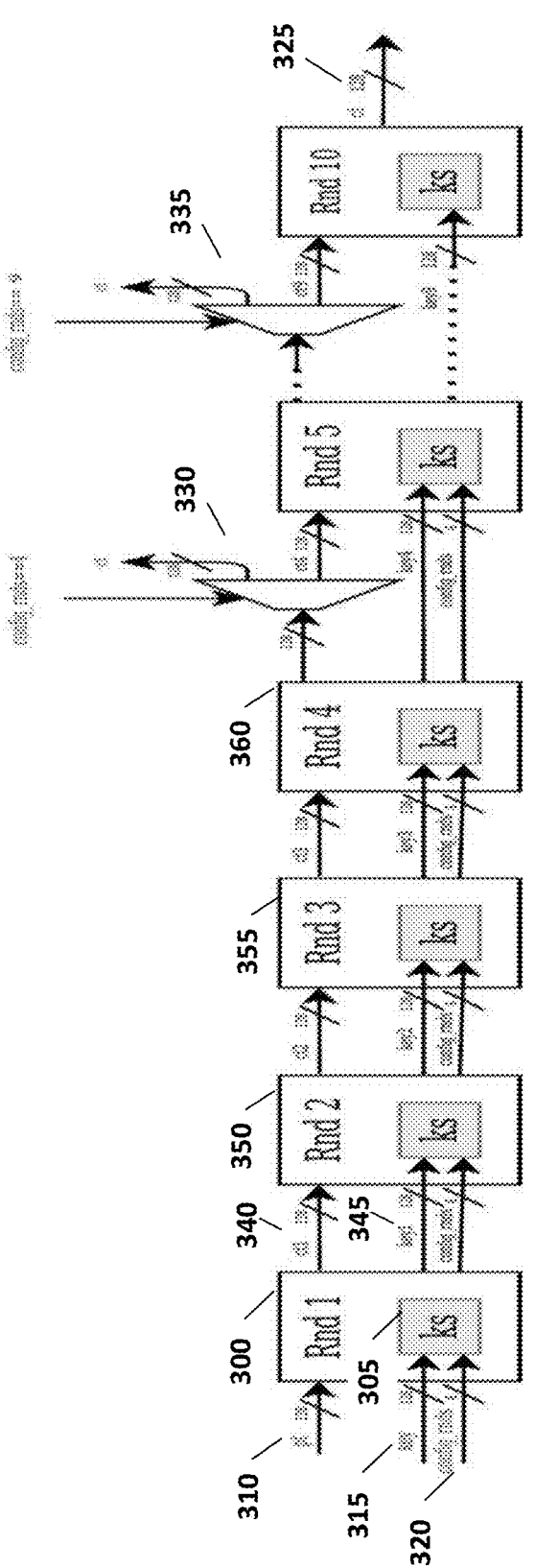
FIG. 3 shows a non-limiting example of an encryption workflow, in accordance with some embodiments.

The efficiency of the encryption algorithm may further be improved by reducing latency. As an example, AES-128 comprises a minimum of a 10 clock latency hit on each 16 bytes of data that is being encrypted, since completion of the previous 16 bytes' computation needs to be completed before the next 16 bytes of data can be encrypted. In some embodiments, the efficiency of the algorithm can be improved by breaking down the 10 rounds (in the case of AES-128) as a 10 stage pipelined design where data computed in the previous round is passed to the next, as shown in FIG. 3. In some cases, each round has its own key scheduler 305, thus allowing the pipeline to take in 16 bytes of data back-to-back instead of waiting for the previous 16 bytes data to go through all 10 rounds. In such cases, the first 16 bytes output data may take a hit of 10 clock latency, while the remaining data can be outputted back-to-back.

Configuring each round to have its own key scheduler 305, as illustrated in FIG. 3, may further allow the user to configure the number of rounds of the encryption operations. In some cases, user configurability of the number of rounds may help to improve the overall performance of the encryption. In some cases, the minimum number of rounds may be established during boot time and may be held constant for the whole encryption cycle.

Referring to the encryption pipeline in FIG. 3, the input may comprise plaintext 310, an initial key 315, and a 4-bit select bit, congif_rnds 320, which can be used to control the number of rounds for the AES encryption operation. In some embodiments, the number of rounds for the encryption operation is 4, 5, 6, 7, 8, 9, 10, 11, 12, 13, or 14. In some cases, the number of rounds for the encryption operation is 4, 5, 6, 7, 8, 9, or 10. As shown in FIG. 3, if the user sets config_rnds 320 to be 4, then the plaintext 310 undergoes four encryption cycles (e.g., round one 300, round two 350, round three 355, and round four 360) and the ciphertext is outputted 330. Further, if the user sets config_rnds 320 to be 9, then the cipher text is outputted after the ninth round 335. In some cases, the number of rounds for the encryption operation has a minimum of 4. In some cases, the number of rounds for the encryption operation has a maximum of 10. In some cases, the number of rounds for the encryption operation has a maximum of 12. In some cases, the number of rounds for the encryption operation has a maximum of 14. As shown in FIG. 3, the plaintext 310 and the initial key 315 may be passed to round 1 300, which then passes ciphertext 1 340 and key 1 345 on to round 2 350. This process may be repeated for the configured number of rounds. In some cases, the keys generated in each round may be stored. The output of the data from the encryption pipeline of FIG. 3 after 10 rounds comprises ciphertext 325 that can be stored in the memory as described herein.

In some embodiments, the flexibility to the user that allows for an improved performance may compromise security. For example, the National Institute of Standards and Technology (NIST)'s standard number of rounds for such AES encryption is 10, but the pipeline disclosed herein is configurable to perform less than 10 rounds. In some examples, the number of rounds is at least 4.

While the embodiments above are described using an AES-XTS algorithm with the AES-128 encryption operations (with 10 rounds), one of skill in the art will appreciate that other encryption algorithms may be employed by incorporating the user configurability (e.g., block size, number of rounds, etc.) described herein. In some embodiments, AES encryption operation comprises AES-192 (with 12 rounds). In some embodiments, AES encryption operation comprises AES-256 (with 14 rounds).

Decryption Pipeline

Figure 4:
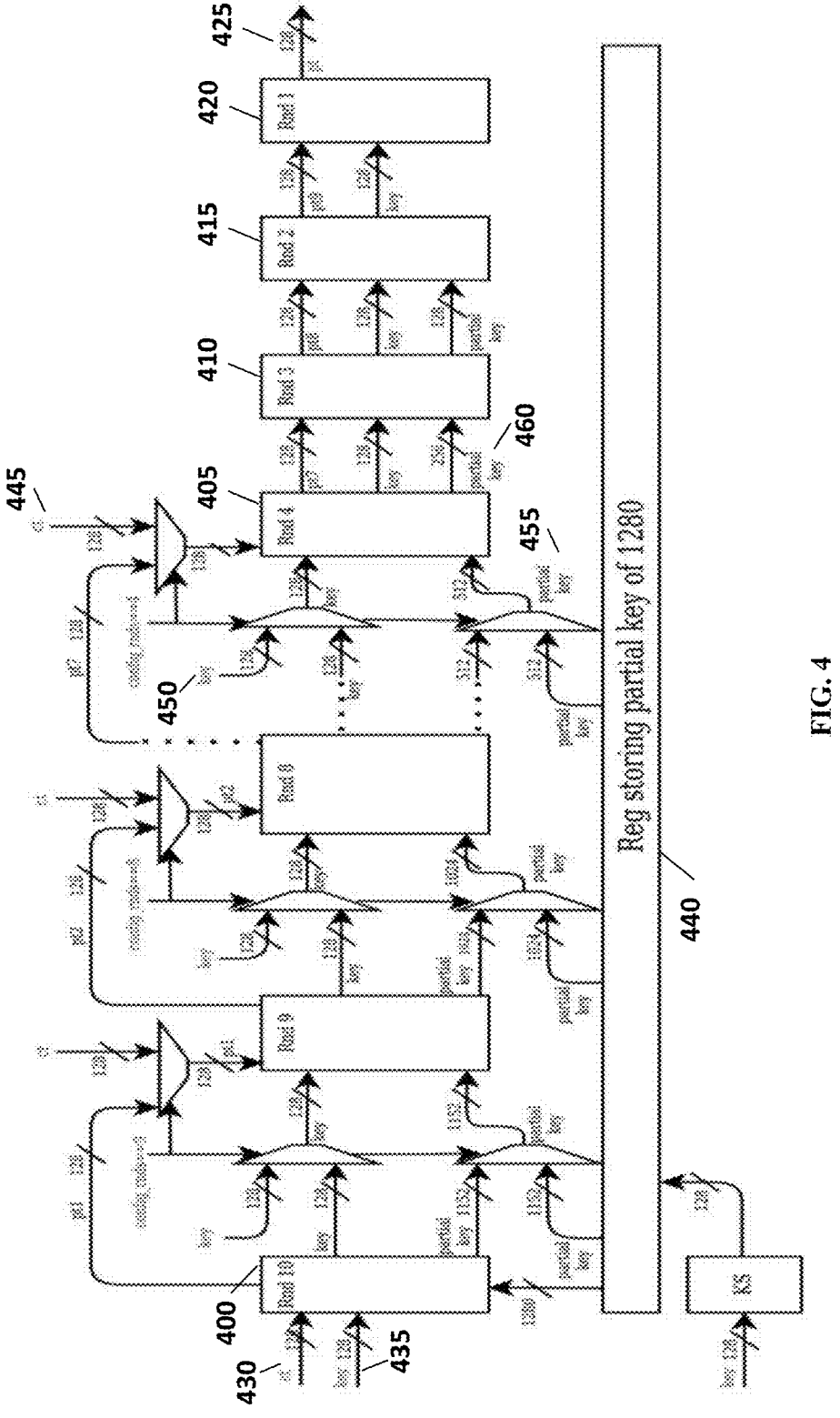
FIG. 4 shows a non-limiting example of a decryption workflow, in accordance with some embodiments.

An exemplary diagram of a decryption workflow is illustrated in FIG. 4. The input for the decryption workflow may comprises a ciphertext 430 and an initial key 435 that may be loaded from the key scheduler. In some embodiments, the number of rounds for the decryption operation is 4, 5, 6, 7, 8, 9, 10, 11, 12, 13, or 14, in accordance with the number of rounds of encryption operation. In some cases, the number of rounds for the encryption operation is 4, 5, 6, 7, 8, 9, or 10, in accordance with the number of rounds of encryption operation. In some embodiments, the encrypted data in a memory must be decrypted to attain correct functionality matching the encryption pipeline. As an example, during decryption, the seventh 405, eighth 410, ninth 415, and tenth 420 iteration of decryption needs to be performed using the keys used in the fourth 360, third 355, second 350, and first 300 encryption round, respectively, that were obtained from the key scheduling.

As an example, if there were four rounds of encryption, key scheduling may be completed in 4 clock cycles, which may be followed by 4 iterations of decryption. In some cases, the keys may be stored during the encryption process and may be retrieved from a register storing partial keys 440 during the decryption process. In some instances, this can avoid the need to recompute the keys again during the decryption process. In some examples, this may improve the overall efficiency and performance by decreasing the compute time of the decryption. When there are four rounds of encryption, the decryption process may start at round four 405. The input may comprise ciphertext 445, the initial key 450 and the partial key 455, which comprise keys from the four rounds of encryption that were stored in the register storing partial keys 440. In some cases, the partial key 455 may comprise 512 bytes comprising the four keys that are each 128 bytes. As shown in FIG. 4, the ciphertext 445 and the initial key 450 may be passed to round 3 410, as well as the partial key 460, which is now 256 bytes since the fourth key was already used for round 4 405. This exemplary process may be repeated for the configured number of rounds. In some embodiments, each round in FIG. 4 comprises the decryption steps from the AES encryption operations described herein. In some embodiments, the output from the decryption comprises plaintext 425.

XTS Blocks

Figure 5:
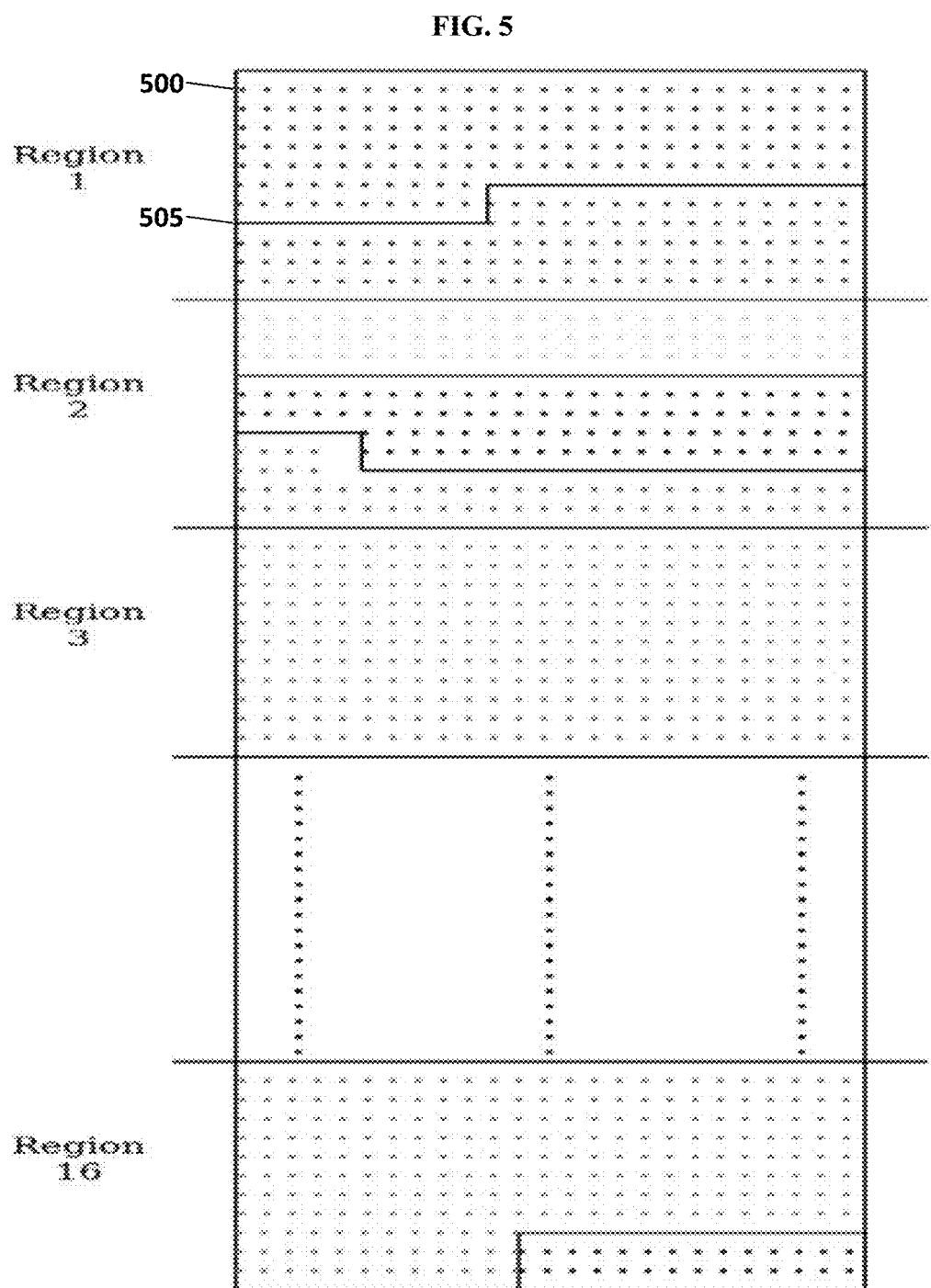
FIG. 5 shows a non-limiting example of a sub-divided memory block, with block sizes of non-multiple of 16 bytes, in accordance with some embodiments.

The memory protection system of the present disclosure may comprise input data that may be divided into XTS blocks. According to the XTS protocol, once a set of data is encrypted based on a given XTS protocol, then the data should get decrypted in the exact similar fashion in order to get back the actual plaintext data. In some embodiments, the tweak value may be considered as the starting address of each XTS block. In some embodiments, the data may be divided into XTS block sizes of non-multiples of 16 bytes, as illustrated in FIG. 5. In the proposed architecture of the memory protection system, data sizes of non-multiples of 16 bytes may be taken into consideration. However, in such cases, a lot of context (e.g., the start and end address of the encryption, keys, etc.) may need to be maintained in order to support XTS block sizes of non-multiple of 16 bytes. FIG. 5 illustrates a non-limiting example of XTS block sizes of non-multiple of 16 bytes, where each dotted line 500 may be considered as a 16 byte data line and each dividing line 505 represents an XTS block size of non-multiple of 16 bytes. In such a case, all the context of start addresses and end addresses may be required to be kept. In some instances, this may be entirely dynamic and unpredictable in a real time traffic.

Figure 6:
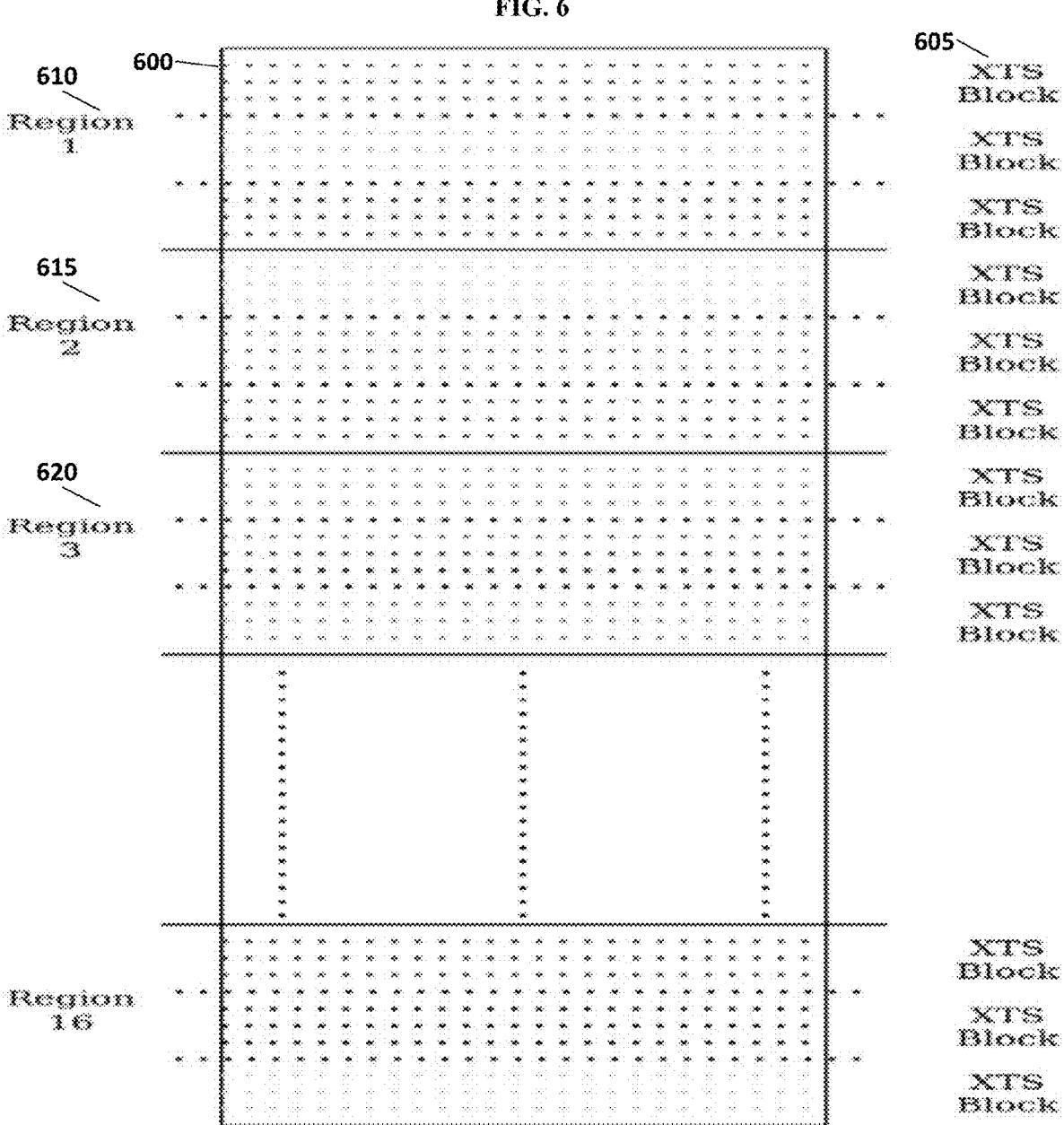
FIG. 6 shows a non-limiting example of a sub-divided memory block, with block sizes of multiple of 16 bytes, in accordance with some embodiments.

In some embodiments, the data may be divided into XTS block sizes of multiples of 16 bytes, as illustrated in FIG. 6. This may allow the start addresses and end addresses to be predictable and may be determined based on the XTS configurable block size. In such cases, the hardware may be able to compute the start addresses, the end addresses, or both on the fly. As shown in FIG. 6, where each dotted line 600 may be considered as a 16 byte data line, each XTS block 605 may then comprise 64 bytes of data (e.g., 4×16 bytes), and the whole memory is evenly divided into multiple XTS block chunks of 64 bytes. In some embodiments, the XTS block size is configured every boot time. In some cases, the XTS block size may be 128 bytes, 256 bytes, or 512 bytes.

Figure 7:
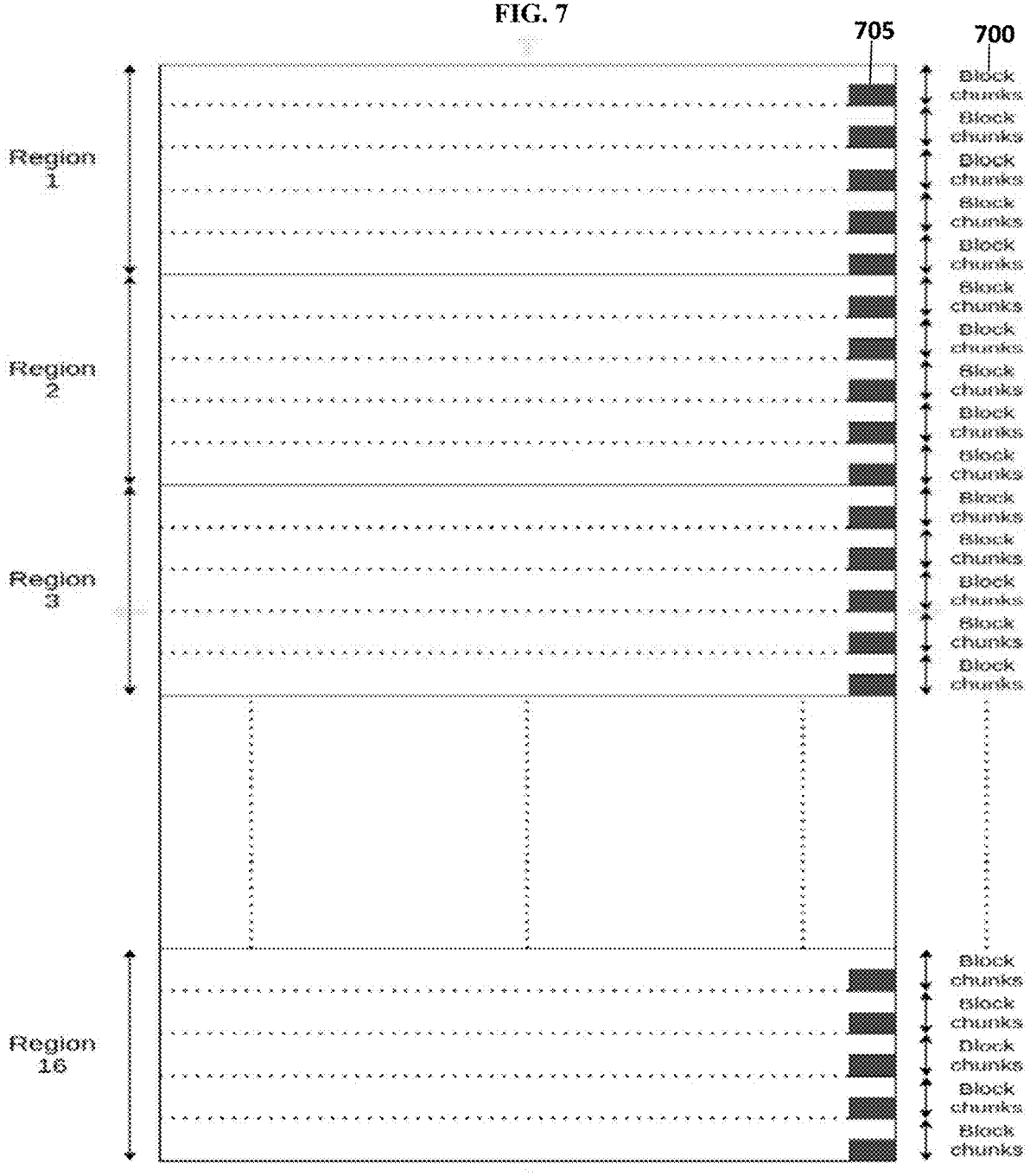
FIG. 7 shows a non-limiting example of a sub-divided memory block, with start addresses of each block, in accordance with some embodiments.
Figure 8:
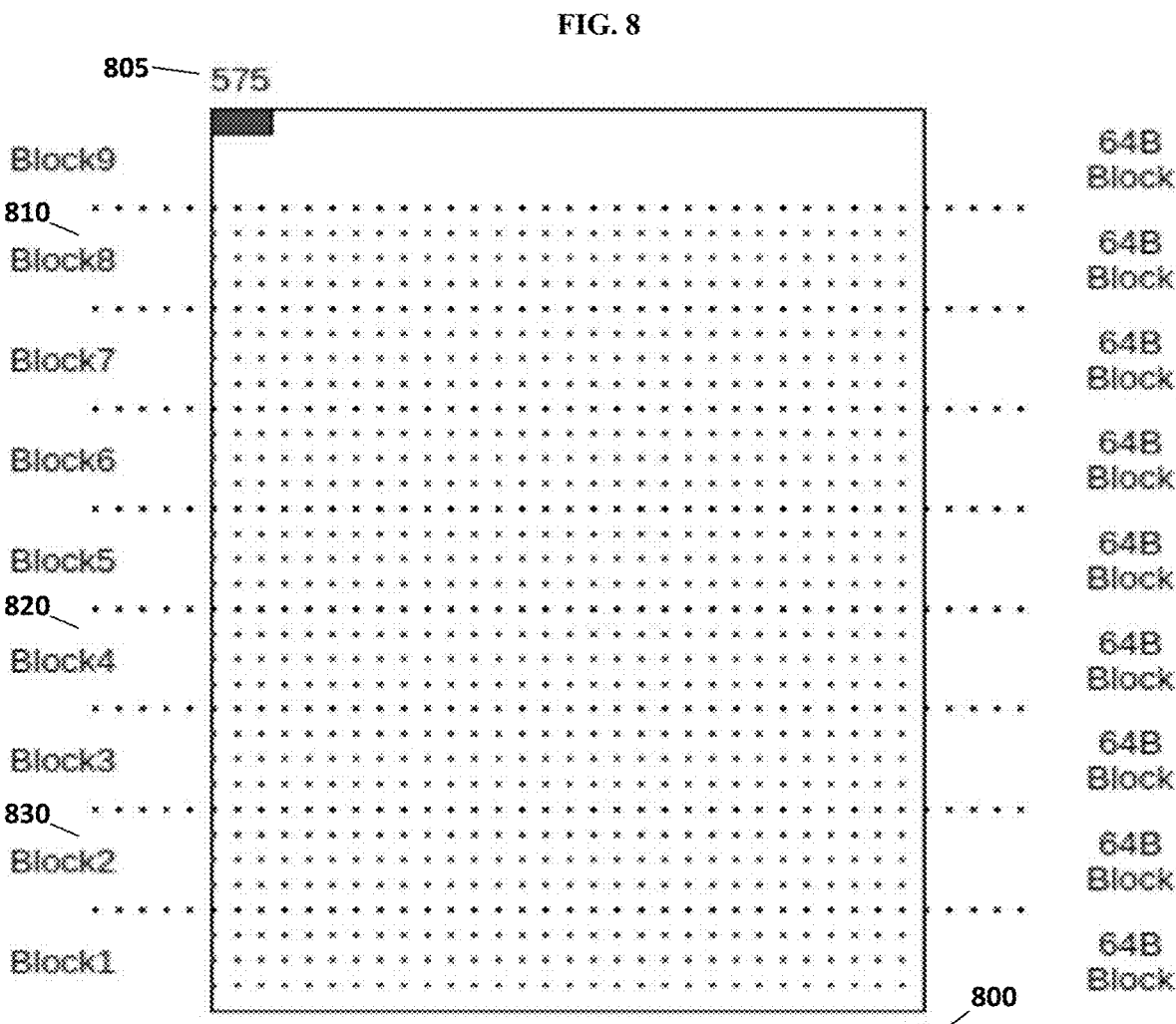
FIG. 8 shows a non-limiting example of a memory write of a memory block, in accordance with some embodiments.

In some embodiments, each XTS block may comprise a start address, or a tweak value, which is illustrated in FIG. 7. When the data is evenly sub-divided into 16 bytes, each block chunk 700 within the XTS block may comprise a start address 705. Encrypting or decrypting evenly sub-divided data may be referred to as a full write transaction or a full read transaction, respectively. In some cases, a full write transaction may comprise scenarios where the start address and end address of a memory write data is aligned with the 16 byte boundary. In some cases, a full read transaction may comprise scenarios where the start address and end address of a memory read data is aligned with the 16 byte boundary. FIG. 8 illustrates a non-limiting example of a memory write of 4K bytes comprising a start address at 0 800. Writing the memory block illustrated in FIG. 8 may comprise a full write transaction as the start address 800 is aligned with the start address of the XTS block and end address is aligned with the 16 byte boundary. The end of the data in FIG. 8 is represented as the memory 805 (e.g., a total of 576 bytes). In some cases, data may be written up to Block 8 810, in total writing 512 bytes of data. In alternative cases, data may be written up to Block 4 820, in total writing 256 bytes of data. In further alternative cases, data may be written up to Block 2 830, in total writing 128 bytes of data. In some embodiments, the full memory write transaction illustrated in FIG. 8 may also be applicable to a full memory read transaction.

In some embodiments, in spite of the data being non-multiple of 16 bytes, the hardware may restrict the data to be multiple of 16 bytes. In some cases, non-multiple of 16 bytes may require manipulation. Encrypting or decrypting data that is not evenly sub-divided may be referred to as partial write transactions or partial read transactions, respectively. In some cases, the partial write transaction may comprise scenarios where the start address of memory write is not aligned with the start address of XTS block. In some cases, the partial write transaction may comprise scenarios where the end address is not aligned with the 16 byte boundary. In some cases, the partial write transaction may comprise scenarios where the data size is non-multiple of 16 byte.

Figure 9:
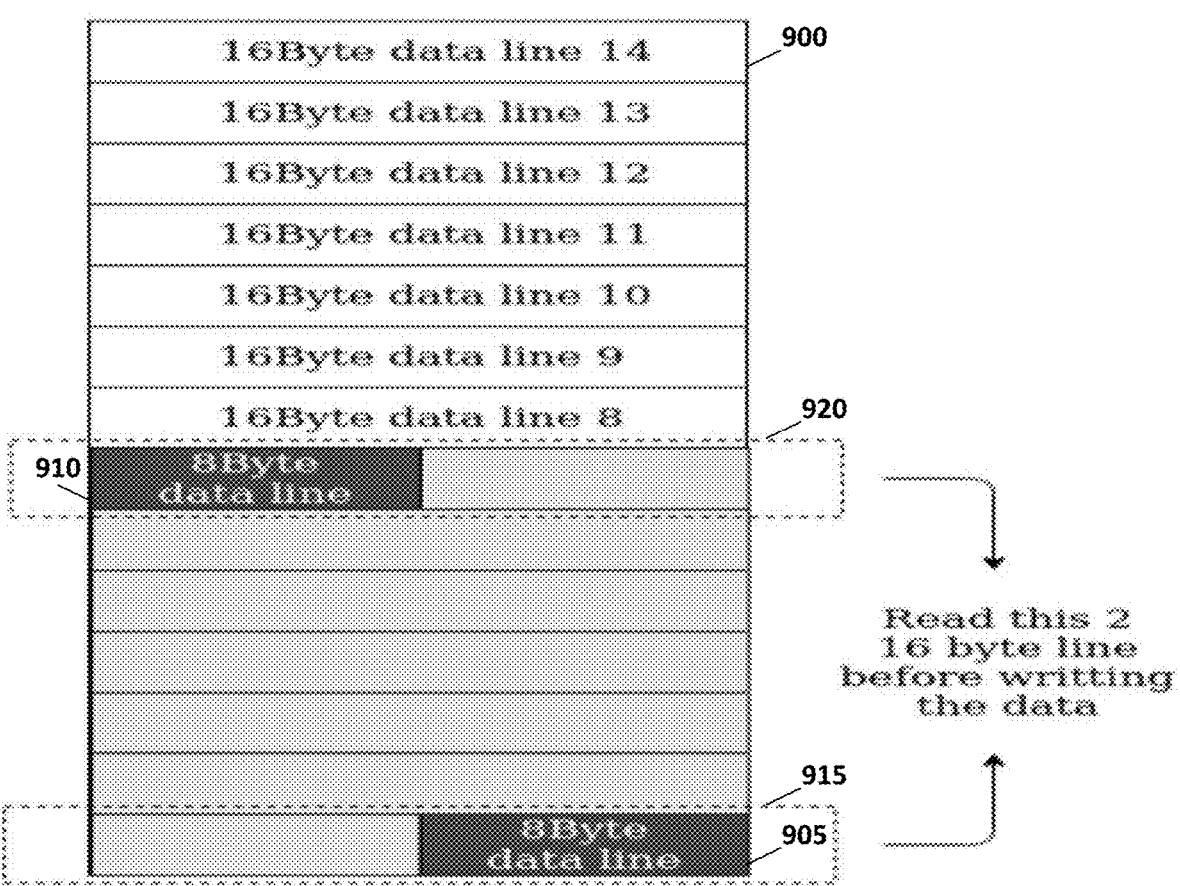
FIG. 9 shows a non-limiting example of a partial write transaction, in accordance with some embodiments.

FIG. 9 provides a non-limiting example of a partial write transaction. Each line 900 in FIG. 9 may represent 16 bytes of data. In FIG. 9, the data size may comprise a non-multiple of 16 bytes. Further, the data may be unaligned with the XTS block start address 905, while the end address 910 may also be unaligned with 16 byte boundary. As shown, line 915 comprising the start address 905 and line 920 comprising the end address 910, are each 8 byte data lines. In some cases, each 8 byte data line may be initially encrypted separately. In some embodiments, an extra read transaction may be issued for each of the lines 915 and 920, in order to read back the start data 905 and end data 910, modify the data to be 16 bytes, and write back the modified data to the memory in order to maintain 16 byte granularity within the memory. This process of manipulating data of non-multiple of 16 bytes is exemplary illustrated in FIG. 10.

Figure 10:
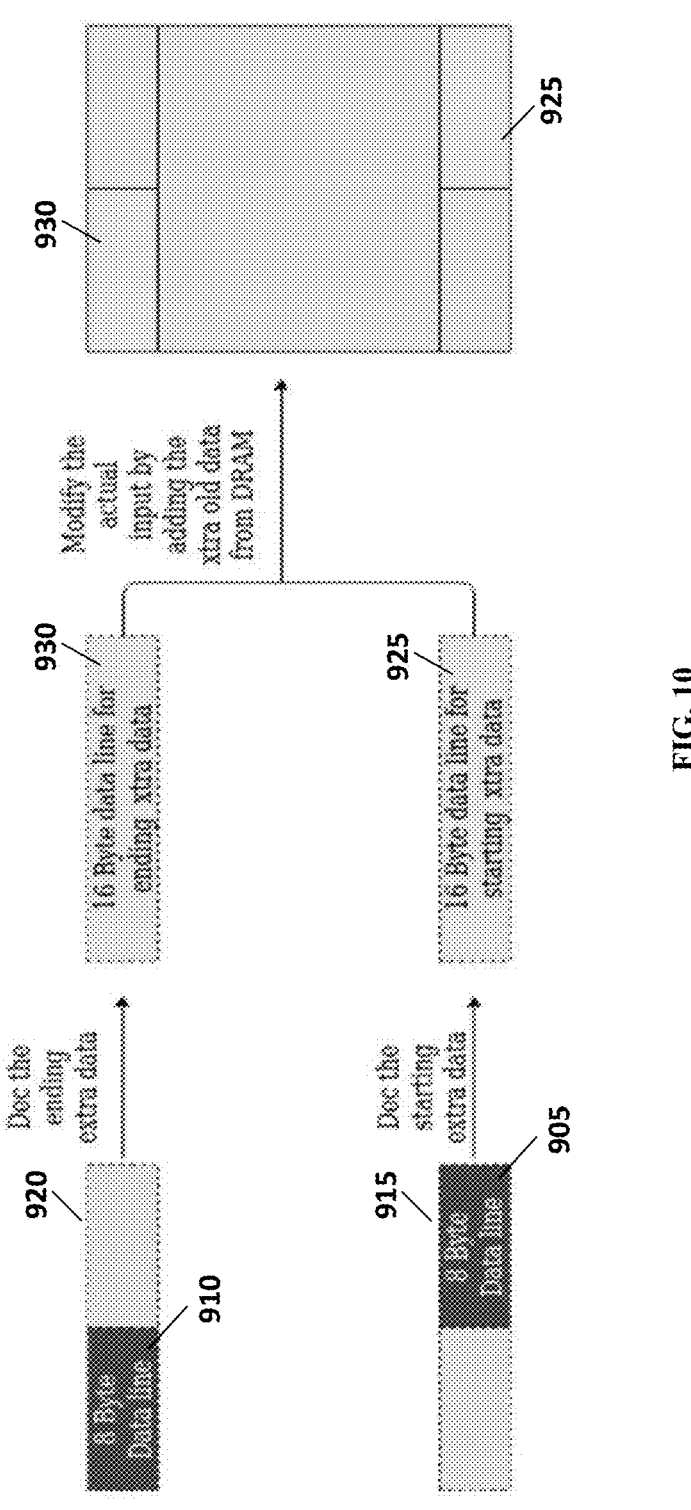
FIG. 10 shows a non-limiting example of a partial write transaction, in accordance with some embodiments.

As shown in FIG. 10, extra read transactions are issued for each line 915 and 920 comprising the start 905 and the end 910, respectively, which may comprise decrypting each line 915 and 920 that were initially encrypted. Once decrypted, the data in lines 915 and 920 (e.g., plaintext) may be concatenated with additional data to generate 16 byte data lines 925 and 930. In some cases, the data in lines 915 and 920 (e.g., plaintext) may be concatenated with a write request to generate the 16 byte data lines 925 and 930. Once 16 byte data lines are generated, the initial input data may then be modified. In some cases, modifying the input data may comprise overwriting the initial input comprising 8 byte data lines 915 and 920 with the 16 byte data lines 925 and 930. The overwritten lines may then be encrypted once again and written back to memory.

In some embodiments, the partial memory write transactions illustrated in FIG. 9 and FIG. 10 may also be applicable to a partial memory read transaction. In some cases, for partial read transactions, the start address may be modified to match the near lowest start address. In some cases, for partial read transactions, the end address may be modified to match the near higher 16 byte address. As a result, data integrity and granularity can be maintained within 16 bytes of data, while allowing a requester (e.g., user) to receive the desired read data.

Key Mapping Unit

The memory protection system of the present disclosure may comprise a key mapping unit comprising a control register block. Generally, the control register block may comprise a processor register which changes and/or controls the general behavior of a CPU or any other digital device. In some embodiments, the control register block may interrupt control, switch an addressing mode, paging control, or coprocessor control, or any combination thereof. In the control register block, registers (e.g., accessible locations within a processor) may be configured with a start address and end address of each XTS key set. An exemplary key mapping unit is illustrated in FIG. 11.

Figure 11:
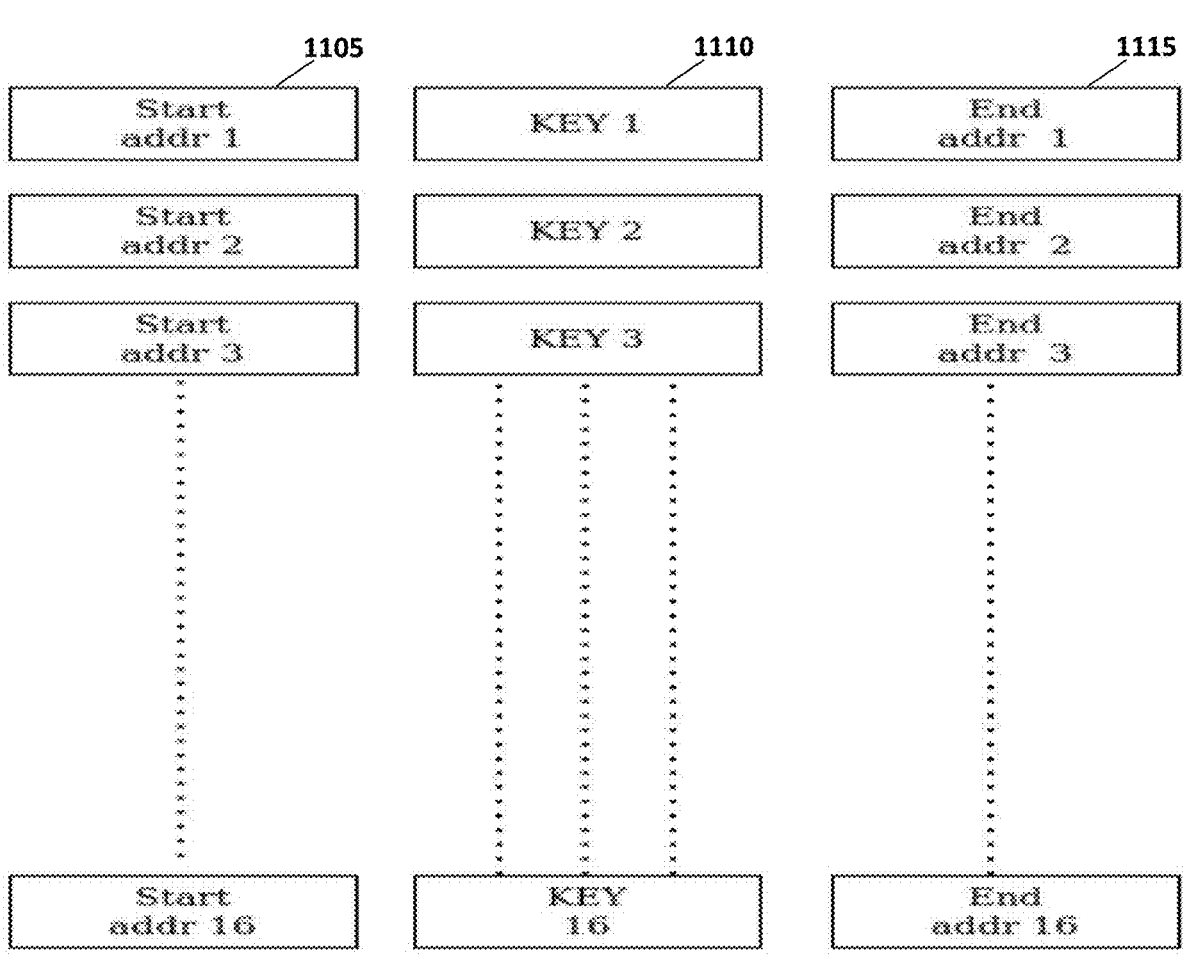
FIG. 11 shows a non-limiting example of a key mapping units, in accordance with some embodiments.

In FIG. 11, 16 sets of keys are shown for 16 regions in a memory model (e.g., as shown in FIG. 5-7). In some embodiments, each of the keys 1110 may represent two sets of keys, since XTS may require two sets of 16 byte keys, as previously described. In some cases, one of the two sets of keys may be used for the AES block encryption, as previously described herein. In some cases, one of the two sets of key may be used to encrypt the tweak value, as previously described herein. Each key may be configured with a start address 1105 and end address 1115, which may indicate the scope (e.g., location) of each key within the memory.

Key Refresh Mechanism

The memory protection system of the present disclosure may comprise a key refresh mechanism, where the keys used for the encryption of data may be required to be updated. In some cases, the keys may be updated regularly to provide improved security. In some embodiments, the key refresh mechanism may be handled by a memory crypto engine (MCE).

The memory may be divided into multiple regions (e.g., Region 1 610, Region 2 615, Region 3 620, etc. in FIG. 6), and the key refresh mechanism may handle one region at a time. Therefore, a key refresh mechanism for a region of memory using an MCE may comprise updating the keys block by block (e.g., XTS block 605 in FIG. 6). In some embodiments, the MCE may check whenever the read traffic slows down. In some cases, if the read traffic slows down, the MCE may read back an XTS block data, decrypt it, halt the traffic from starting a new memory write transaction, encrypt back the read data with a new key, and write it back to the memory. The read traffic may then be resumed.

In some embodiments, the MCE may further maintain a pointer, which may indicate up to what address of an ongoing key refresh region the data has been encrypted with a new key. Hence, during an ongoing key refresh of a region, the MCE may keep track of a pointer to know up to what point in the data the key has been refreshed. The MCE may further maintain context if there are two sets of keys, such as by naming the keys "old key" and "new key." Once a whole region is updated with a new key, the MCE may then let the old key expire and interrupt the processor.

In some embodiments, there may be a dedicated for tweak encryption for both XTS encryption and decryption. This engine may not part of the AES pipelined design previously described herein. In some embodiments, the pipeline AES design comparatively may require a lot of hardware, whereas for tweak encryption only a 16 byte encryption may be needed. Therefore, there may be little to gain by using a pipelined encryption design for tweak encryption.

For data encryption and decryption, there may be a dedicated encryption and decryption pipelined engine correspondingly, so that data may be encrypted back-to-back, as previously described herein. In some embodiments, since the XTS encryption and decryption may be tied to a write channel and read channel, respectively, write and read may be accessed in parallel.

XTS Bypass Mode

The memory protection system of the present disclosure may comprise a bypass mode. In a bypass mode, a processor may set a bit for each corresponding region indicating whether to bypass that region or not. In some embodiments, the bypass mode may utilize thresholds for engaging (e.g., "high") or disengaging (e.g., "low") the bypass mode. In some cases, if a bypass mode is set to high, then an MCE may not encrypt or decrypt that region of data, and hence the data may be written and read as is (e.g., in plaintext). In some cases, if a bypass mode is set to low, then an MCE may encrypt or decrypt that region of data.

Figure 12:
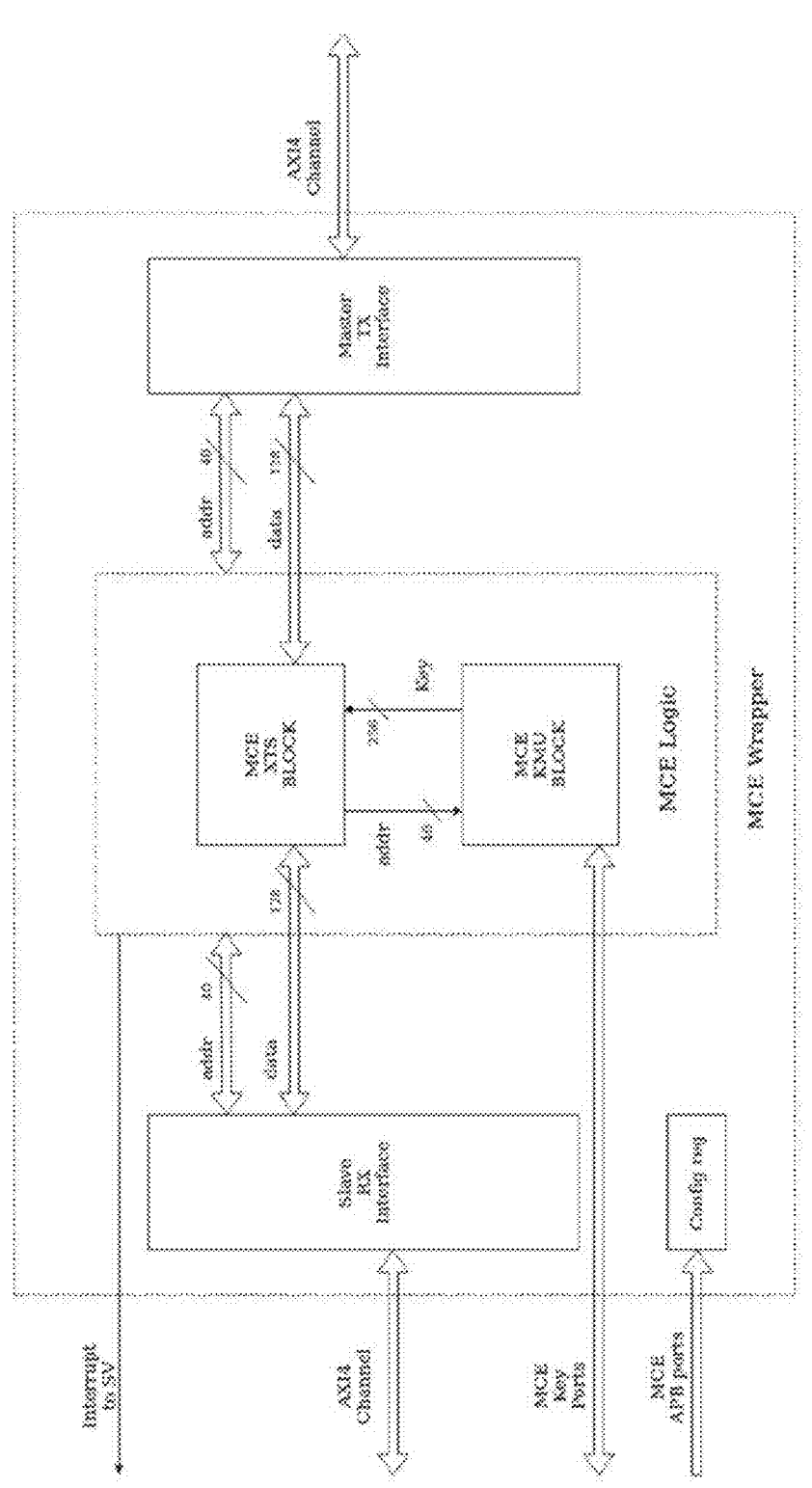
FIG. 12 shows a non-limiting example of a memory crypto engine (MCE) block diagram, in accordance with some embodiments.

FIG. 12 provides an exemplary block diagram of an MCE, where the interface may comprise an Advanced eXtensible Interface (AXI). In some cases, the MCE may be compatible to any other interface protocol. As shown, the config reg block may accepts the configuration during boot time. In some cases, the configuration may comprise the number of config rounds, bypass of regions, XTS block size, start and end address of regions, or any combination thereof.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented memory protection system comprising:
   a) a memory partitioned into a plurality of blocks, wherein a block size of the plurality of blocks is based on an encryption algorithm; and
   b) a circuitry configured to execute memory read or memory write transactions with the memory, the circuitry comprising the encryption algorithm and configured to perform operations comprising:
      i) encrypt, using the encryption algorithm, write operations to the memory; and
      ii) decrypt, using the encryption algorithm, read operations from the memory;

wherein the encryption algorithm comprises the block size;
wherein the encryption algorithm comprises a pipeline comprising a plurality of stages, each stage conducting a round of an encryption operation, passing data computed to a next stage until a final stage is reached, and comprising a key scheduler;
wherein the encryption algorithm comprises a number of rounds for the encryption operation,
wherein the block size or the number of rounds of encryption is user configurable through a user interface, and wherein the block size or the number of rounds for the encryption operation is set at boot-time and cannot be changed at run-time.

2. The system of claim 1, wherein the memory is implemented on a chip with the circuitry.

3. The system of claim 1, wherein the memory implemented external to the circuitry.

4. The system of claim 1, wherein the circuit is configured to encrypt all write transactions with the memory.

5. The system of claim 1, wherein the encryption algorithm comprises an XTS-AES algorithm and the encryption operation comprises an AES encryption operation.

6. The system of claim 1, wherein the block size is 64, 128, 256, or 512 bytes.

7. The system of claim 1, wherein the block size has a minimum of 64 bytes.

8. The system of claim 1, wherein the block size has a maximum of 512 bytes.

9. The system of claim 1, wherein the number of rounds for the encryption operation is 4, 5, 6, 7, 8, 9, or 10.

10. The system of claim 1, wherein the number of rounds for the encryption operation has a minimum of 4 or a maximum of 10.

11. The system of claim 1, wherein the key scheduler of each stage is configured to generate and store a round key for use thereby allowing the pipeline to take in data blocks back-to-back and allowing a remaining output data to be produced back-to-back after an initial latency.

12. The system of claim 1, wherein the pipeline comprises a 4-bit select bit to configure the number of rounds for the encryption operation.

13. The system of claim 1, wherein the pipeline comprises 10 stages.

14. The system of claim 1, wherein the pipelined allows the system to process successive data blocks back-to-back without waiting for completion of all encryption rounds for a previous data block.

15. A computer-implemented method of a memory protection system that comprises circuitry configured to execute memory read or memory write transactions within a memory and further comprises an encryption algorithm, the method comprising:
   a) providing an interface allowing a user to configure a block size used by the encryption algorithm;
   b) providing an interface allowing the user to configure a number of rounds for an encryption operation performed by the encryption algorithm;
   c) partitioning the memory into a plurality of blocks based on the block size;
   d) encrypting, utilizing the encryption algorithm, write operations to the memory, the encryption algorithm comprising a pipeline comprising a plurality of stages, each stage conducting a round of the encryption operation, passing data computed to a next stage until a final stage is reached, and comprising a key scheduler; and e) decrypting, utilizing the encryption algorithm, read operations from the memory, the decrypting performed by the encryption algorithm, wherein the block size or the number of rounds for the encryption operation is set at boot time and cannot be changed at run-time.

16. The method of claim 15, wherein d) and e) are performed by the circuitry, and wherein the memory is implemented on a chip with the circuitry.

17. The method of claim 15, wherein d) and e) are performed by the circuitry, and wherein the memory is implemented external to the circuitry.

18. The method of claim 15, wherein the encrypting and decrypting are performed on all transactions with the memory.

19. The method of claim 15, wherein the encryption algorithm comprises an XTS-AES algorithm and the encryption operation comprises an AES encryption operation.

20. The method of claim 15, wherein the block size is 64, 128, 256, or 512 bytes.

21. The method of claim 15, wherein the block size has a minimum of 64 bytes.

22. The method of claim 15, wherein the block size has a maximum of 512 bytes.

23. The method of claim 15, wherein the number of rounds for the encryption operation is 4, 5, 6, 7, 8, 9, or 10.

24. The method of claim 15, wherein the number of rounds for the encryption operation has a minimum of 4.

25. The method of claim 15, wherein the number of rounds for the encryption operation has a maximum of 10.

26. The method of claim 15, wherein the pipeline comprises a 4-bit select bit to configure the number of rounds for the encryption operation.

27. The method of claim 15, wherein the pipeline comprises 10 stages.

* * * * *